United States Patent
Simes

(10) Patent No.: US 7,286,967 B2
(45) Date of Patent: Oct. 23, 2007

(54) RETRIEVING PERFORMANCE DATA FROM DEVICES IN A STORAGE AREA NETWORK

(75) Inventor: Scott T. Simes, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 935 days.

(21) Appl. No.: 10/687,595

(22) Filed: Oct. 20, 2003

(65) Prior Publication Data

US 2005/0086554 A1    Apr. 21, 2005

(51) Int. Cl.
*G06F 19/00*    (2006.01)
(52) U.S. Cl. ........................................ 702/185; 714/25
(58) Field of Classification Search ................ 702/185, 702/182–184, 188; 714/25, 47
See application file for complete search history.

(56) References Cited

U.S. PATENT DOCUMENTS

2006/0136575 A1*    6/2006    Payne et al. ................ 709/219

* cited by examiner

Primary Examiner—Edward Raymond

(57) ABSTRACT

A system and method for retrieving performance data from different devices in a storage area network (SAN) use a performance interface to communicate with different types of SAN devices in a heterogeneous SAN environment. The performance interface instructs a device plug-in (DPI) associated with each SAN device to retrieve performance metrics data from the corresponding SAN device. The performance interface determines a minimum polling interval and a maximum polling interval for polling each SAN device for the performance metrics data. The performance interface further provides each DPI with an address of the corresponding SAN device.

20 Claims, 4 Drawing Sheets

RETRIEVING PERFORMANCE DATA FROM DEVICES IN A STORAGE AREA NETWORK

TECHNICAL FIELD

The technical field relates to storage area networks, and, in particular, to improvements in monitoring the performance of a storage area network.

BACKGROUND

A storage area network (SAN) is a network of elements including multiple servers, multiple storage devices (such as disk arrays and tape libraries), and a high-speed network of interconnecting elements (such as fiber channels, switches, hubs, and bridges) that establishes direct and indirect connections between the servers, between the storage devices, and between the servers and the storage devices.

SANs are, however, typically made of heterogeneous modules. As a result of their versatility and popularity, a number of different SAN devices exist on the market, each having its own protocols and requirements. Further, current SAN management tools are often vendor-dependent and system-dependent. Since each SAN device may be produced by a different vendor, and each SAN device may have its own proprietary communication systems and information, the management of SAN resources is a difficult task for storage administrators.

SUMMARY

A method for using a performance interface to retrieve performance data from SAN devices in a storage area network (SAN) includes instructing a device plug-in (DPI) to retrieve performance metrics data from a corresponding SAN device, determining a minimum polling interval for polling the SAN device for the performance metrics data, determining a maximum polling interval for polling the SAN device for the performance metrics data, and collecting the performance metrics data from the DPI using the performance interface.

DESCRIPTION OF THE DRAWINGS

The preferred embodiments of the method and apparatus for retrieving performance data from SAN devices in a local area network (SAN) will be described in detail with reference to the following figures, in which like numerals refer to like elements, and wherein.

DETAILED DESCRIPTION

A system and method for retrieving performance data from different devices in a storage area network (SAN) use a performance interface to communicate effectively with different types of SAN devices in a heterogeneous SAN environment. The performance interface instructs a device plug-in (DPI) associated with each SAN device to retrieve performance metrics data from the corresponding SAN device. The performance interface determines a minimum polling interval and a maximum polling interval for polling each SAN device for the performance metrics data. The performance interface further provides each DPI with an address of the corresponding SAN device.

The performance interface may be implemented with a storage area manager (SAM) and a storage optimizer, such as the OPENVIEW® SAM and storage optimizer. The SAM supports enterprise storage utility services with integrated tools that help information technology (IT) departments reduce storage management costs, protect existing storage investments, efficiently utilize resources, and deliver guaranteed quality of service to customers, partners, and employees. The SAM enables system administrators to simplify and automate management of multivendor storage resources across disk, tape, direct-attach, and networked storage infrastructures. The SAM can also centrally manage and monitor availability, performance, usage, growth, and cost across a distributed enterprise. Further, the SAM enables system administrators to optimize resource utilization and operations, and to seamlessly integrate storage and storage services with the enterprise-wide IT service management system.

The storage optimizer may, from a single management station, monitor the performance of storage network components, including hosts, infrastructure and storage. The storage optimizer also collects data and provides a complete reporting structure for evaluating, monitoring and managing the quality and cost of IT services. System administrators can receive automatic notification of impending performance problems before the problems become serious, and can track performance of the system components over time. The storage optimizer helps system administrators predict problems and improve efficiencies while optimizing investment in networked storage. The combination of performance monitoring, historical tracking, and trend analysis makes the storage optimizer a powerful tool for analyzing and upgrading storage infrastructure.

Figure 1:
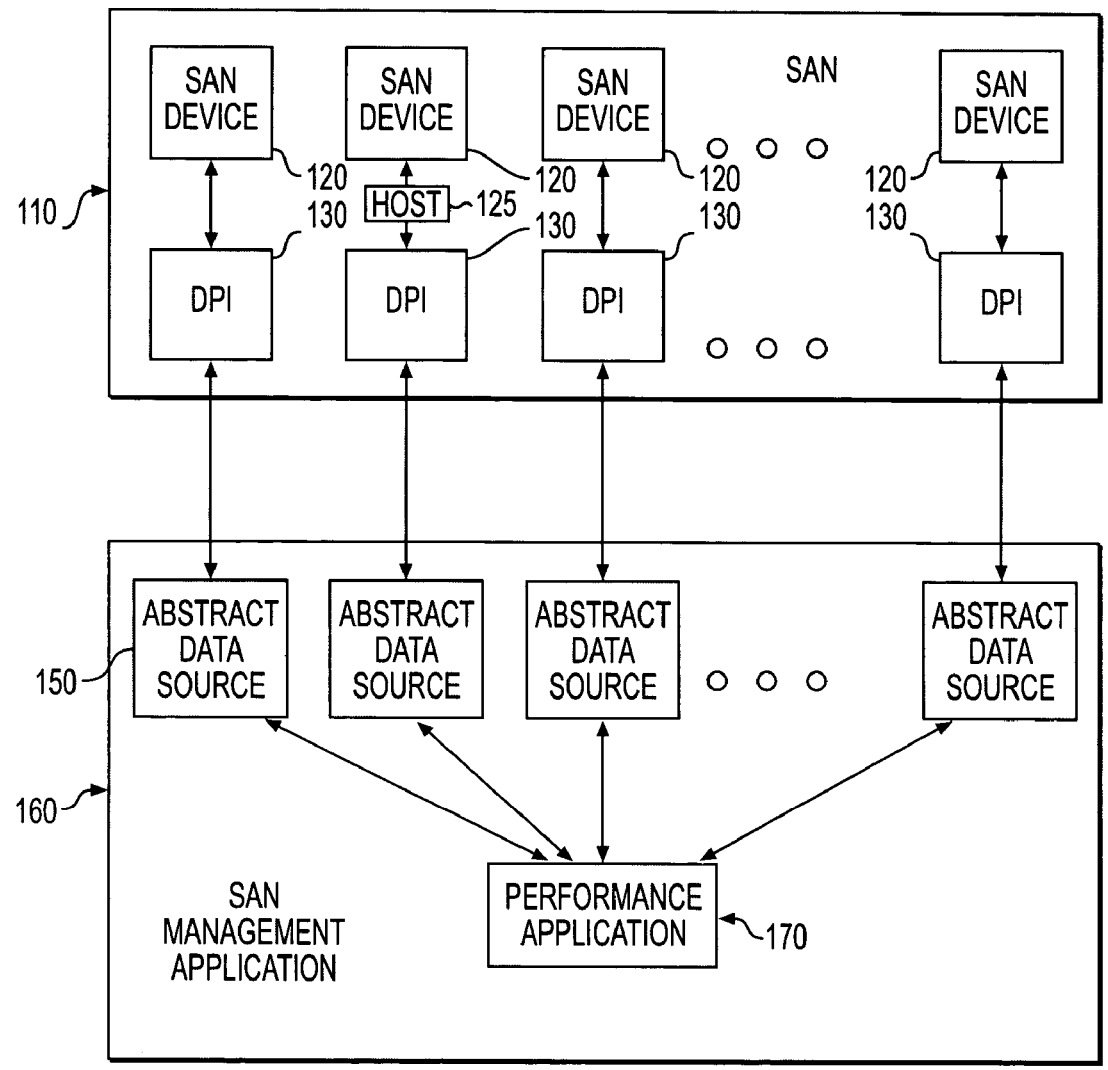
FIG. 1 illustrates an exemplary system for retrieving performance data from SAN devices in a SAN.

FIG. 1 illustrates an exemplary system for retrieving performance data from SAN devices in a SAN. Referring to FIG. 1, a SAN 110 includes several SAN devices 120, such as storage arrays, and corresponding device plug-ins (DPIs) 130 for each SAN device 120. A DPI 130 is Java code specifically written to the specifications of the SAN management software. The DPI 130 allows the corresponding SAN device 120 to communicate with a SAN management application 160. The DPI 130 is specific to each SAN device 120 and may be developed by any software developer. The DPI 130 may communicate with the corresponding SAN device 120 directly using, for example, Simple Network Management Protocol (SNMP). Other SAN devices 120 may require a separate host machine 125 to communicate with the corresponding DPIs 130. The host machine 125 typically maintains a database (not shown) that stores performance data for the SAN device 120.

With continued reference to FIG. 1, the SAN 110 is managed by the SAN management application 160. The SAN management application 160 includes corresponding abstract data sources 150 for each SAN device 120 and a performance application 170. The abstract data source 150 may be Java code. The performance application 170 collects performance metrics data from the SAN devices 120 in the SAN 110. Examples of performance metrics data include a number of device write operations, read operations, and cache hits. Each abstract data source 150 within the SAN management application 160 has a one-to-one relationship with each SAN device 120. The abstract data source 150 uses the methods defined within performance interface 140 (shown in FIG. 2) to communicate with the SAN device 120 through the corresponding DPI 130.

Figure 2:
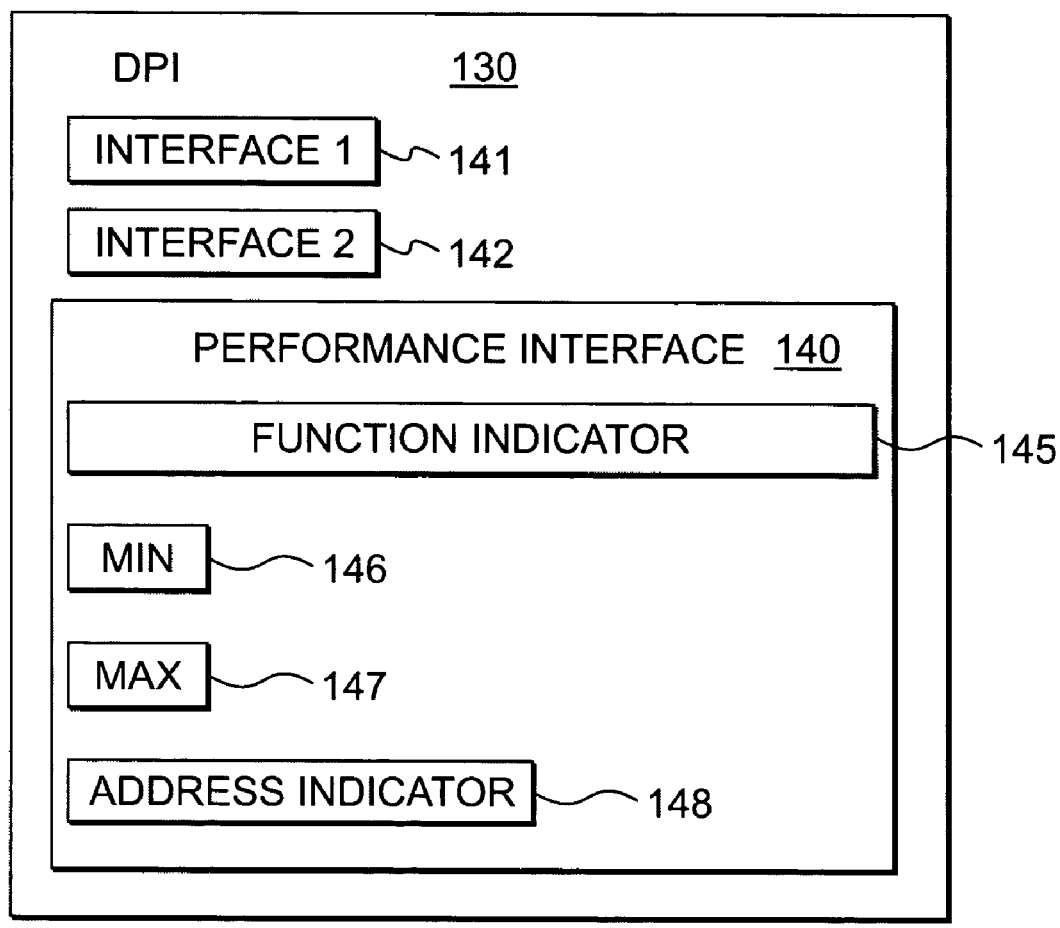
FIG. 2 illustrates an exemplary device plug-in (DPI) that is used in the exemplary system of FIG. 1 for retrieving performance data.

FIG. 2 illustrates an exemplary DPI 130 that is used in the exemplary system of FIG. 1 for retrieving performance data. The DPI 130 is a building block of interfaces, such as the performance interface 140, an interface 141 for reporting port information, and an interface 142 for reporting internal disk information. The performance interface 140 is an interface between the DPI 130 and the corresponding abstract data sources 150. As noted above, each abstract data source 150 has a one-to-one relationship with each SAN device 120. When the abstract data source 150 makes a request for performance data, the DPI 130 implements methods (i.e., Java code) in the performance interface 140 to retrieve the performance metrics data from the corresponding SAN device 120. Different SAN devices 120 provide performance data in different formats. The performance interface 140 provides a single method the performance application 170 can call to retrieve performance metrics data from the SAN devices 120 in a SAN 110.

The performance interface 140 includes a function indicator 145 that instructs the DPI 130 to retrieve performance data from the corresponding SAN device 120. When the performance application 170 collects performance metric data from a given SAN device 120, the corresponding abstract data source 150 may make a request to the corresponding DPI 130. The DPI 130 implements the methods in the performance interface 140, which instructs the DPI 130 to retrieve the requisite performance metric data from the corresponding SAN device 120. The performance interface 140 allows the individual DPI 130 to utilize whatever means necessary to gather the information from the corresponding SAN device 120. For example, the DPI 130 may perform a task to collect performance data. Examples of the task include: reading log files maintained by a SAN device 120, navigating the structure of internal counters maintained by the SAN device 120, and implementing specific application programming interface (API) calls into management software for the SAN device 120.

The performance interface 140 further includes a minimum polling indicator 146 and a maximum polling indicator 147. The performance application 170 may periodically "poll" all SAN devices 120 to obtain performance metric data. The minimum polling indicator 146 determines a minimum polling interval for polling a SAN device 120 for performance data. The minimum polling interval is the shortest time between performance metric collection that should occur. The minimum polling interval may vary from SAN device 120 to SAN device 120 according to the rate a SAN device 120 updates its performance data. The minimum polling interval may be a matter of seconds (such as for an Interconnect device) or as long as an hour (such as for a disk array device).

The maximum polling indicator 147 determines a maximum polling interval for polling a SAN device 120 for performance data. The maximum polling interval is the longest time between performance metric collection that should be allowed to occur. The maximum polling interval may vary from SAN device 120 to SAN device 120 similar to the minimum polling interval. The performance interface 140 determines the minimum polling interval and the maximum polling interval for each SAN device 120, enabling each SAN device 120 to be accurately polled by the performance application 170 at a rate between the minimum and the maximum polling intervals.

The performance interface 140 further includes an address indicator 148 that automatically provides the DPI 130 with the address of the SAN device 120. For example, if the SAN device 120 communicates with the corresponding DPI 130 through a host machine, the host machine 125 typically maintains the database that stores performance data for the corresponding SAN device 120. The performance interface 140 may provide the DPI 130 with the address on the host machine 125 to retrieve the performance metrics data for the corresponding SAN device 120. The performance application 170 does not need to "know" whether a DPI 130 communicates with the corresponding SAN device 120 directly or through a host machine 125.

Figure 3:
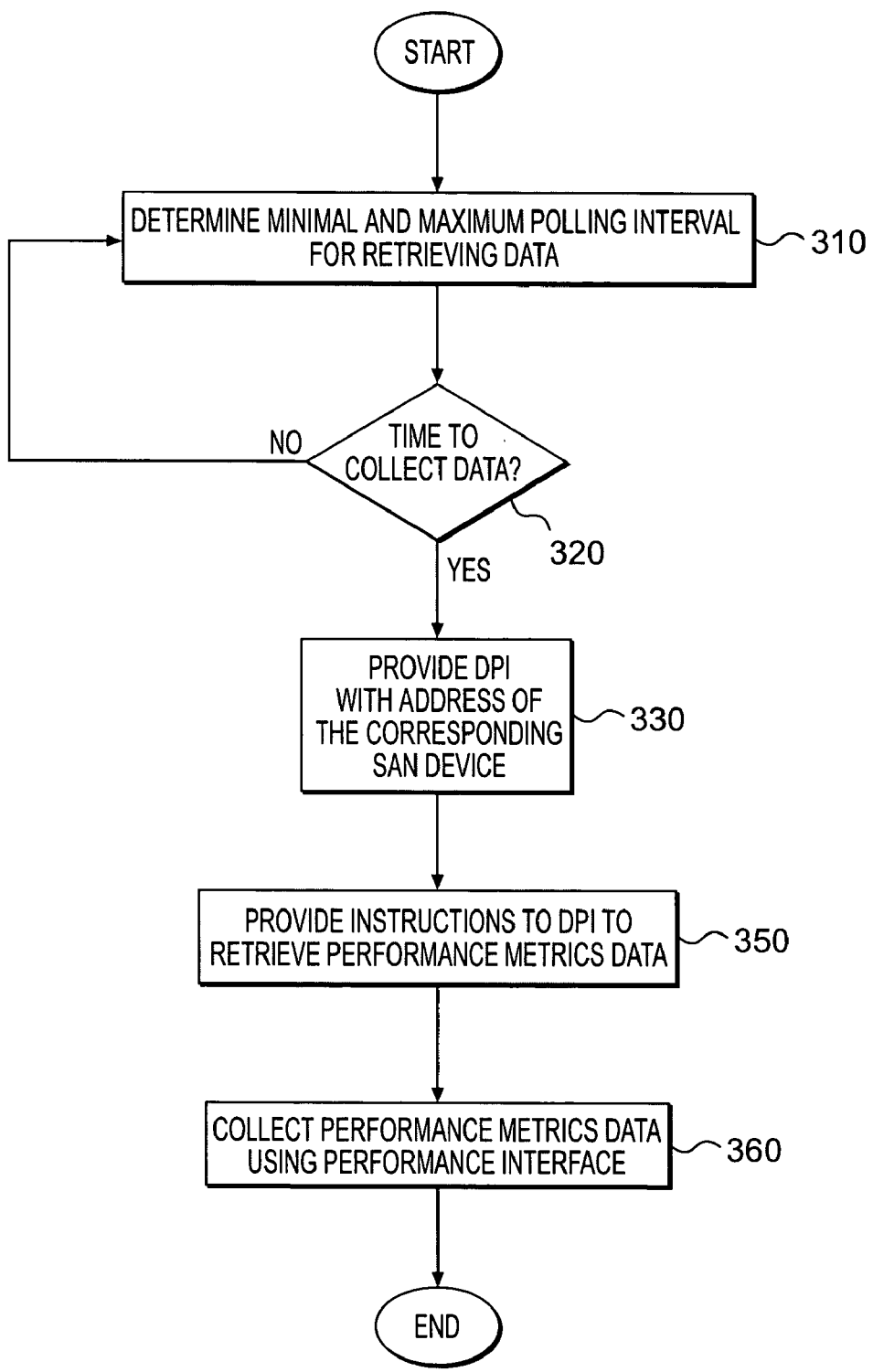
FIG. 3 is a flowchart illustrating an exemplary method for using a performance interface to retrieve performance data from SAN devices in a SAN.

FIG. 3 is a flowchart illustrating an exemplary method for using a performance interface to retrieve performance data from SAN devices 120 in a SAN 110. The performance interface 140 determines a minimum polling interval and a maximum polling interval for polling each SAN device 120 for the performance metrics data (block 310). After establishing the polling interval (block 320), the performance interface 140 provides each DPI 130 with the address of the corresponding SAN device 120 (block 330). Next, the performance interface 140 instructs the DPI 130 to retrieve performance metrics data from the corresponding SAN device 120 (block 350). The DPI 130 may perform a task to collect the performance metrics data. The task may include reading log files maintained by a SAN device 120, navigating the structure of internal counters maintained by the SAN device 120, and implementing specific application programming interface (API) calls into management software for the SAN device 120. The performance application 170 then collects the performance metrics data using the performance interface 140 (block 360).

Figure 4:
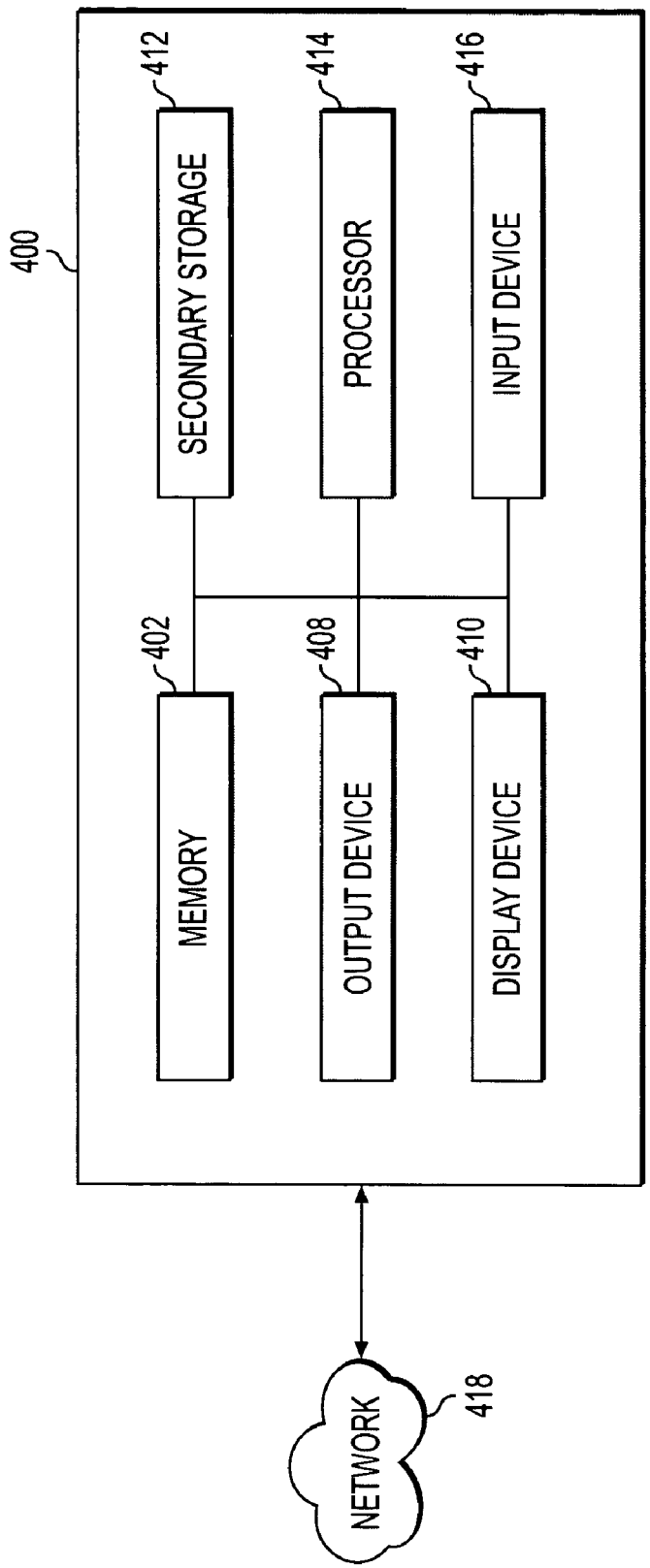
FIG. 4 illustrates exemplary hardware components of a computer that may be used in connection with the exemplary method for using a performance interface to retrieve performance data from SAN devices in a SAN.

FIG. 4 illustrates exemplary hardware components of a computer 400 that may be used in connection with the method for retrieving performance data from SAN devices 120 in a SAN 110. The computer 400 includes a connection 420 with a network 418 such as the Internet or other type of computer or telephone network. The computer 400 typically includes a memory 402, a secondary storage device 412, a processor 414, an input device 416, a display device 410, and an output device 408.

The memory 402 may include random access memory (RAM) or similar types of memory. The secondary storage device 412 may include a hard disk drive, floppy disk drive, CD-ROM drive, or other types of non-volatile data storage, and may correspond with various databases or other resources. The processor 414 may execute information stored in the memory 402, the secondary storage 412, or received from the Internet or other network 418. The input device 416 may include any device for entering data into the computer 400, such as a keyboard, keypad, cursor-control device, touch-screen (possibly with a stylus), or microphone. The display device 410 may include any type of device for presenting visual image, such as, for example, a computer monitor, flat-screen display, or display panel. The output device 408 may include any type of device for presenting data in hard copy format, such as a printer, and other types of output devices including speakers or any device for providing data in audio form. The computer 400 can possibly include multiple input devices, output devices, and display devices.

Although the computer 400 is depicted with various components, one skilled in the art will appreciate that the computer 400 can contain additional or different components. In addition, although aspects of an implementation consistent with the method for retrieving performance data from SAN devices 120 in a SAN 110 are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 400 to perform a particular method.

While the system and method for retrieving performance data from SAN devices in a SAN have been described in connection with an exemplary embodiment, those skilled in the art will understand that many modifications in light of these teachings are possible, and this application is intended to cover variations thereof.

What is claimed is:

1. A method for using a performance interface to retrieve performance data from SAN devices in a storage area network (SAN), the method comprising:
   instructing a device plug-in (DPI) to retrieve performance metrics data from a corresponding SAN device;
   determining a minimum polling interval for polling the SAN device for the performance metrics data;
   determining a maximum polling interval for polling the SAN device for the performance metrics data; and
   collecting the performance metrics data from the DPI using the performance interface.

2. The method of claim 1, further comprising providing the DPI with an address of the SAN device.

3. The method of claim 1, further comprising instructing the DPI to perform a task to retrieve the performance metrics data.

4. The method of claim 3, wherein the task includes reading log files maintained by the corresponding SAN device.

5. The method of claim 3, wherein the task includes navigating structure of internal counters maintained by the corresponding SAN device.

6. The method of claim 3, wherein the task includes implementing specific application programming interface (API) calls into management software for the corresponding SAN device.

7. The method of claim 1, wherein the instructing step includes instructing the DPI to retrieve performance metrics data from a corresponding storage array.

8. A system for using a performance interface to retrieve performance data from SAN devices in a storage area network (SAN), comprising:
   a plurality of device plug-ins (DPIs), each DPI communicates with a SAN device to retrieve performance metrics data from the SAN device, each DPI comprises a performance interface, the performance interface comprises:
      a function indicator instructing the DPI to retrieve performance metrics data from the corresponding SAN device;
      a minimum polling indicator determining a minimum polling interval for polling the corresponding SAN device for the performance metrics data; and
      a maximum polling indicator determining a maximum polling interval for
   polling the corresponding SAN device for the performance metrics data; and
   a performance application that collects the performance metric data from the plurality of DPIs using the performance interface.

9. The system of claim 8, wherein the performance interface further comprises an address indicator that provides the DPI with an address of the SAN device.

10. The system of claim 8, wherein the DPIs are Java code.

11. The system of claim 8, further comprising a plurality of abstract data sources, each abstract data source corresponding to a SAN device, each abstract data source receiving from and transmitting data to the performance interface.

12. The system of claim 11, wherein the abstract data sources are Java code.

13. The system of claim 8, wherein the performance application polls the SAN at particular intervals between the minimum polling interval and the maximum polling interval.

14. The system of claim 8, wherein the DPIs perform a task to retrieve the performance metrics data.

15. The system of claim 14, wherein the task includes reading log files maintained by the corresponding SAN device.

16. The system of claim 14, wherein the task includes navigating structure of internal counters maintained by the corresponding SAN device.

17. The system of claim 14, wherein the task includes implementing specific application programming interface (API) calls into management software for the corresponding SAN device.

18. A computer readable medium providing instructions for using a performance interface to retrieve performance data from SAN devices in a storage area network (SAN), the instructions comprising:
   instructing a device plug-in (DPI) to retrieve performance metrics data from a corresponding SAN device;
   determining a minimum polling interval for polling the SAN device for the performance metrics data;
   determining a maximum polling interval for polling the SAN device for the performance metrics data; and
   collecting the performance metrics data from the DPI using the performance interface.

19. The computer readable medium of claim 18, further comprising instructions for providing the DPI with an address of the SAN device.

20. The computer readable medium of claim 18, further comprising instructions for instructing the DPI to perform a task to retrieve the performance metrics data.

* * * * *